(12) United States Patent
Hsu et al.

(10) Patent No.: US 12,079,047 B2
(45) Date of Patent: Sep. 3, 2024

(54) HINGE

(71) Applicant: FOSITEK CORPORATION, New Taipei (TW)

(72) Inventors: An-Szu Hsu, New Taipei (TW); An-Wei Chung, Kaohsiung (TW)

(73) Assignee: FOSITEK CORPORATION, New Taipei (TW)

( * ) Notice: Subject to any disclaimer, the term of this patent is extended or adjusted under 35 U.S.C. 154(b) by 52 days.

(21) Appl. No.: 18/153,222

(22) Filed: Jan. 11, 2023

(65) Prior Publication Data
US 2024/0160252 A1 May 16, 2024

(30) Foreign Application Priority Data

Nov. 10, 2022 (TW) .................................. 111142942

(51) Int. Cl.
*E05D 1/04* (2006.01)
*E05D 3/06* (2006.01)
(Continued)

(52) U.S. Cl.
CPC ............ *G06F 1/1681* (2013.01); *F16C 11/04* (2013.01); *E05D 3/122* (2013.01); *E05D 3/18* (2013.01); *E05Y 2999/00* (2024.05)

(58) Field of Classification Search
CPC ...... G06F 1/168; G06F 1/1681; G06F 1/1616; G06F 1/547; E05Y 2900/602; E05Y 2900/606; E05Y 2800/205; E05Y 2800/20; E05Y 2800/242; E05Y 2999/00; H04M 1/022; H04M 1/0214; H04M 1/0216; E05D 3/12; E05D 3/122; E05D 3/14;
(Continued)

(56) References Cited

U.S. PATENT DOCUMENTS 11,907,027 B2 * 2/2024 Torres ....................... E05D 3/06
2021/0271294 A1 * 9/2021 Liao ....................... G06F 1/1681
(Continued)

FOREIGN PATENT DOCUMENTS

CN 216714975 U 6/2022

OTHER PUBLICATIONS

Search Report appended to an Office Action, which was issued to Taiwanese counterpart application No. 111142942 by the TIPO on Mar. 20, 2023 with an English translation thereof.

*Primary Examiner* — Chuck Y Mah
(74) *Attorney, Agent, or Firm* — Birch, Stewart, Kolasch & Birch, LLP

(57) ABSTRACT

A hinge includes a stationary seat and two rotating units. Each rotating unit includes a linkage module that has an extension body that has a arcuate slide rail, a rotating bracket module that is rotatable and that has a fixing pin, and a sliding module that includes a connecting frame, a positioning pin, and a linkage member. The connecting frame has a curved groove that engages the arcuate slide rail such that movement of the rotating units between an opened and a closed state results in movement between the arcuate slide rail and the curved groove. The linkage member has a through hole, and an elongated slot which the fixing pin passes through to connect the rotating bracket module such that movement of the rotating units between the opened and closed states results in movement between the fixing pin and the elongated slot.

5 Claims, 16 Drawing Sheets

(51) Int. Cl.
*F16C 11/04* (2006.01)
*G06F 1/16* (2006.01)
*E05D 3/12* (2006.01)
*E05D 3/18* (2006.01)

(58) Field of Classification Search
CPC .... E05D 3/16; E05D 3/06; E05D 3/18; E05D 11/06; E05D 1/00; E05D 1/02; E05D 1/04; E05D 7/00; F16C 11/04; F16C 11/12
See application file for complete search history.

(56) References Cited

U.S. PATENT DOCUMENTS

| | | | |
|---|---|---|---|
| 2022/0086265 A1* | 3/2022 | Shang | G06F 1/1652 |
| 2023/0021638 A1* | 1/2023 | Yun | F16C 11/04 |
| 2023/0103700 A1* | 4/2023 | Park | G06F 1/1652 |
| | | | 361/679.01 |
| 2023/0151656 A1* | 5/2023 | Yang | E05D 3/18 |
| | | | 360/266.6 |
| 2023/0279898 A1* | 9/2023 | Liu | F16C 11/04 |
| | | | 361/807 |
| 2023/0366248 A1* | 11/2023 | Chung | G06F 1/1681 |
| 2023/0409077 A1* | 12/2023 | Kim | G06F 1/1652 |
| 2024/0036607 A1* | 2/2024 | Yen | G06F 1/1681 |
| 2024/0056517 A1* | 2/2024 | Cheng | H04M 1/0216 |

* cited by examiner

HINGE

CROSS-REFERENCE TO RELATED APPLICATION

This application claims priority to Taiwanese Invention Patent Application No. 111142942, filed on Nov. 10, 2022.

FIELD

The disclosure relates to a hinge, and more particularly to a compact hinge mechanism for electronic devices.

BACKGROUND

Current technological development has led to the maturing of flexible display technology which has subsequently led to the development of foldable electronic devices that use flexible displays.

Most conventional foldable electronic devices that have a flexible display require a hinge mechanism installed between two separate halves of a casing of the electronic device so that the flexible display is supported on the casing and may be folded between a closed state and an opened state. The foldable electronic devices usually have one of two common configurations, one is an in-folding configuration where the flexible display is folded inside and surrounded by the casing in the closed state, and the other one is out-folding configuration in which the flexible display is wrapped around the casing when the flexible display is in the closed state. More specifically, in the in-folding configuration the flexible display is positioned between the two halves of the casing and is folded in a roughly U-shape. This is to prevent the flexible display from being damaged by the folding action, whereby some extra space is provided to the flexible display at the location of the fold.

However, conventional hinges for in-folding foldable electronic devices have quite complex structures with a comparatively large amount of parts, and finding a way to make the hinges more compact while using fewer parts is a problem that needs to be solved.

SUMMARY

Therefore, an object of the disclosure is to provide a hinge that can alleviate at least one of the drawbacks of the prior art.

According to the disclosure, the hinge is adapted for connecting to two shell bodies such that the two shell bodies are openable and closable relative to each other. The hinge includes a stationary seat and two rotating units. The stationary seat has two first curved grooves. The two rotating units are connected to the stationary seat, and are configured to move between an opened state and a closed state. Each rotating unit includes a linkage module, a rotating bracket module, and a sliding module. The linkage module has a main body and an extension body. The main body has a first arcuate slide rail that is slidably mounted in a respective one of the first curved grooves, and a carrying surface. The extension body extends from the stationary seat, and has a second arcuate slide rail. The rotating bracket module is rotatable relative to the stationary seat and has an axle rod connected rotatably to the stationary seat, a bracket body connected to the axle rod, and a fixing pin disposed on the bracket body. The bracket body has an inclined guiding portion that extends straightly and that is inclined relative to the carrying surface. The sliding module includes a connecting frame adapted for connecting with a respective one of the shell bodies, a positioning pin disposed on the connecting frame, and a linkage member having a through hole. The connecting frame has a second curved groove, an accommodating groove, and an inclined sliding portion. The second curved groove is engaged with the second arcuate slide rail such that movement of the rotating units between the opened state and the closed state results in relative movement between the second arcuate slide rail and the second curved groove. The accommodating groove receives the bracket body. The inclined sliding portion is engaged with the inclined guiding portion such that the movement of the rotating units between the opened state and the closed state results in relative movement between the inclined guiding portion and the inclined sliding portion. The positioning pin is located between the second curved groove and the accommodating groove, and passes through the through hole of the linkage member. The linkage member further has an elongated slot that has opposite first and second ends being respectively proximate to and distal from the through hole. The fixing pin passes through the elongated slot to connect with the bracket body such that the movement of the rotating units between the opened state and the closed state results in relative movement between the fixing pin and the elongated slot. When the rotating units are moved from the opened state to the closed state, for each of the rotating units, the connecting frame slides relative to the second curved slide rail and the bracket body. The linkage member is rotated about the positioning pin and is rotated and linearly moved relative to the fixing pin, so that the elongated slot of the linkage member is moved relative to the fixing pin, from the first end portion of the elongated slot being proximate to the fixing pin to the second end portion of the elongated slot being proximate to the fixing pin.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
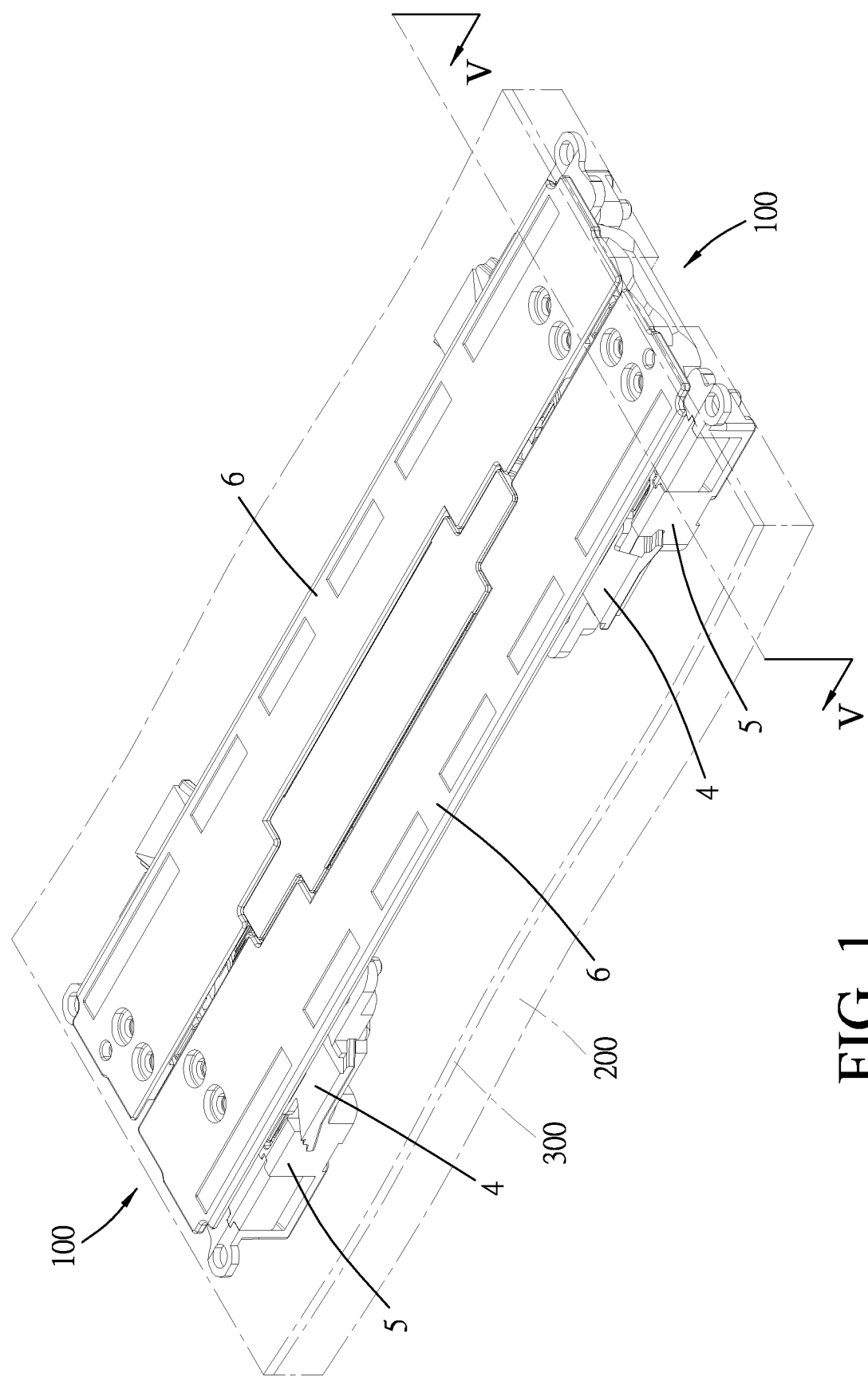
FIG. 1 is a perspective view illustrating an embodiment of two hinges according to present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
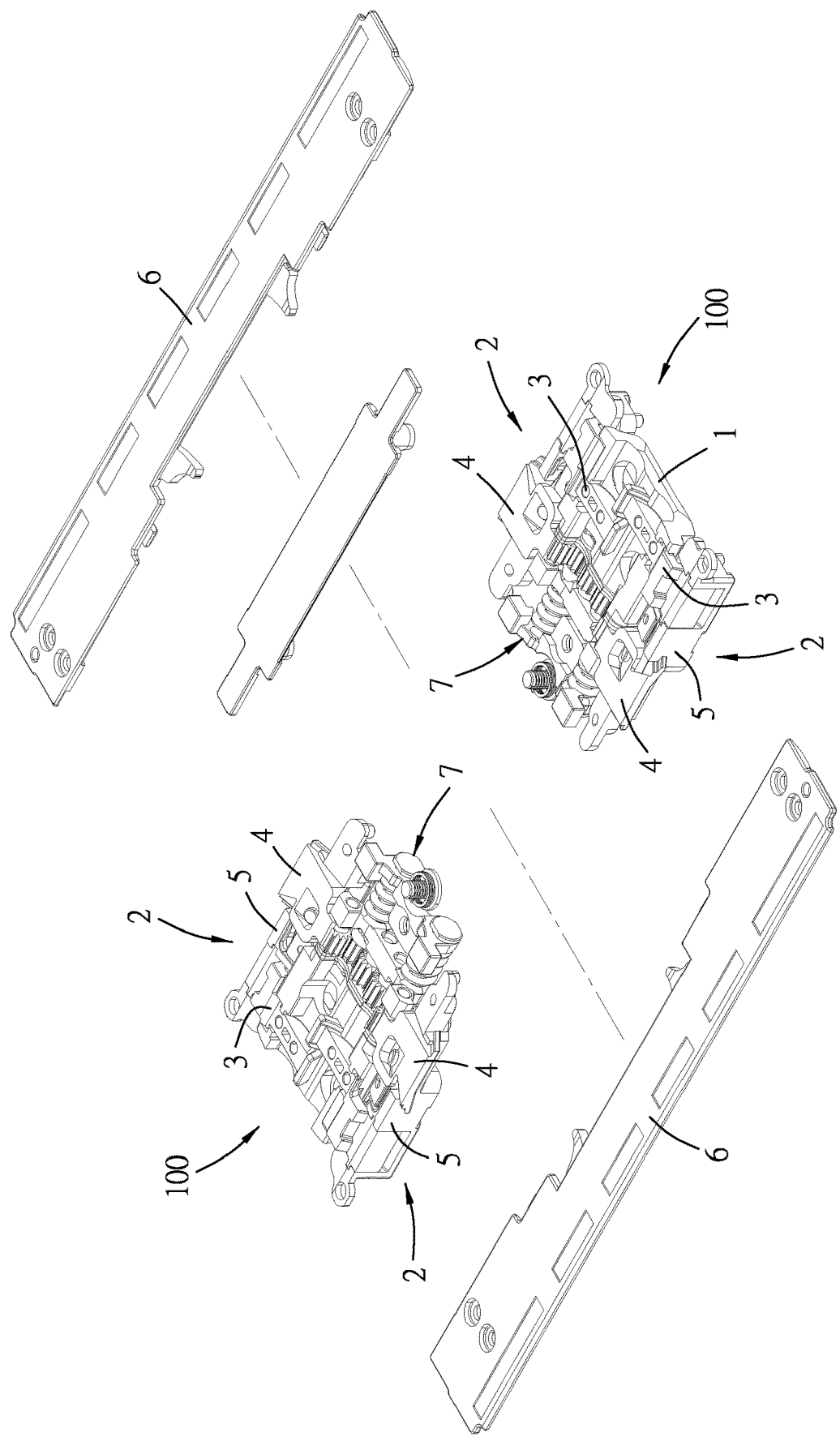
FIG. 2 is a partially exploded perspective view of the two hinges.

Referring to FIGS. 1 to 2, an embodiment of a hinge 100 according to the present disclosure is shown. The hinge 100 is adapted for connecting to two shell bodies 200 such that the two shell bodies 200 are openable and closable relative to each other, and for supporting a flexible display 300. The hinge 100 includes a stationary seat 1, two rotating units 2, and a torque synchronizer 7. FIGS. 1 and 2 illustrate two hinges 100 for connecting the two shell bodies 200; however, for the sake of brevity and clarity, the disclosure will be described from the point of view of one hinge 100.

Figure 3:
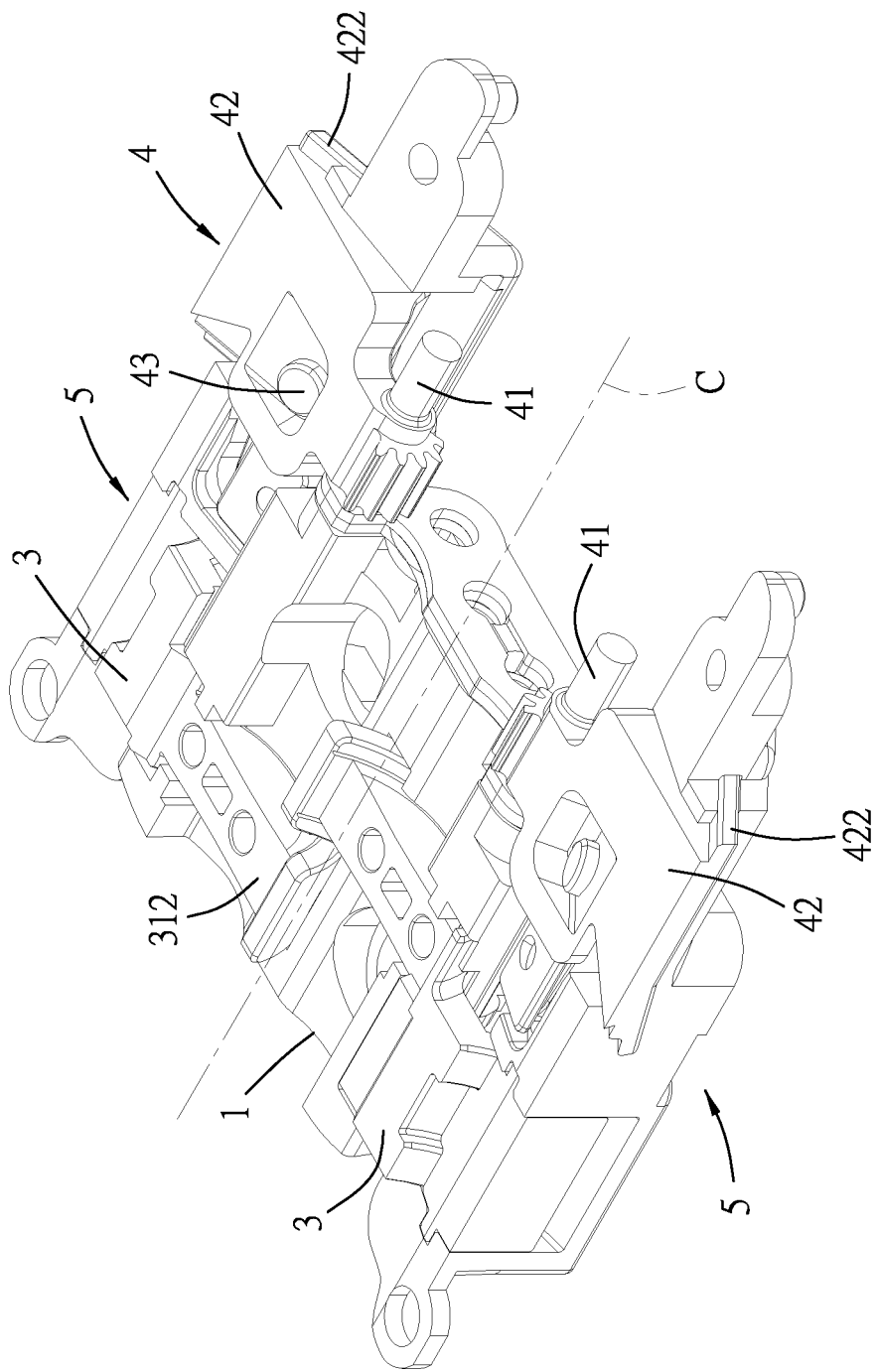
FIG. 3 is a fragmentary perspective view of the embodiment, illustrating two rotating units in an opened state.
Figure 4:
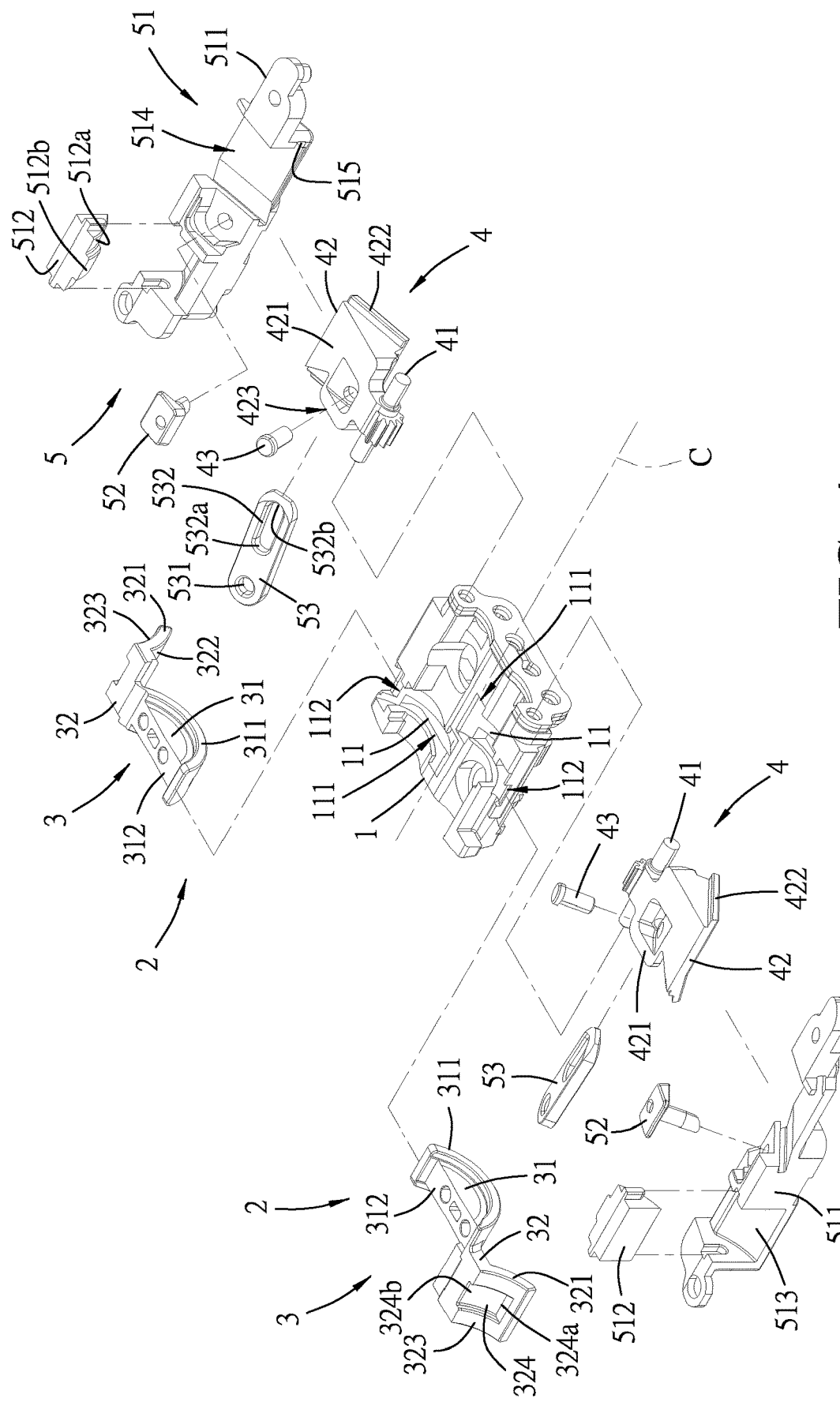
FIG. 4 is a fragmentary exploded perspective view of the embodiment.
Figure 5:
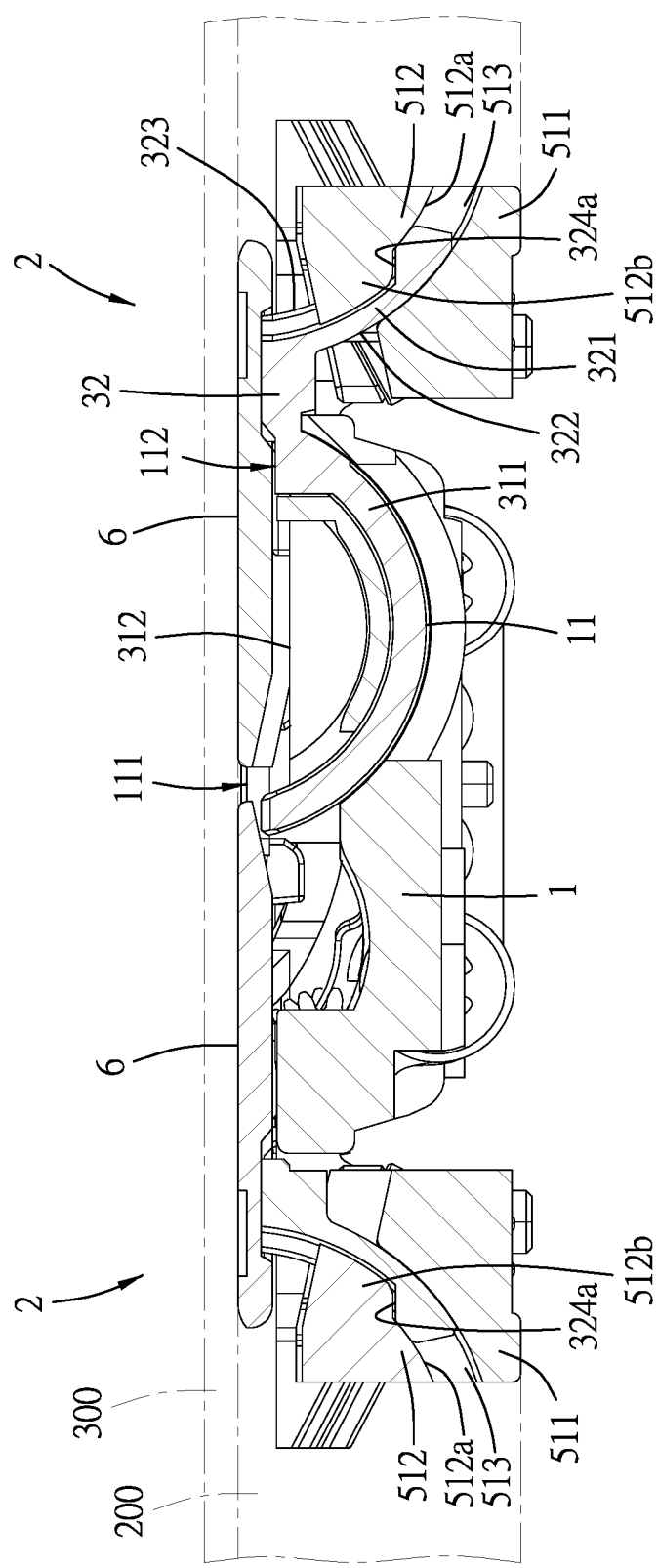
FIG. 5 is a cross-sectional view of the embodiment taken along line V-V in FIG. 1.

Referring to FIGS. 3 to 5, the stationary seat 1 has two first curved grooves 11. In this embodiment, the first curved grooves 11 are arranged along a centerline (C). Additionally, each of the first curved grooves 11 has an inner end 111 that intersects the centerline (C) and an outer end 112 that is opposite to the inner end 111. The outer ends 112 of the first curved grooves 11 are located respectively on two opposite sides of the centerline (C).

Figure 6:
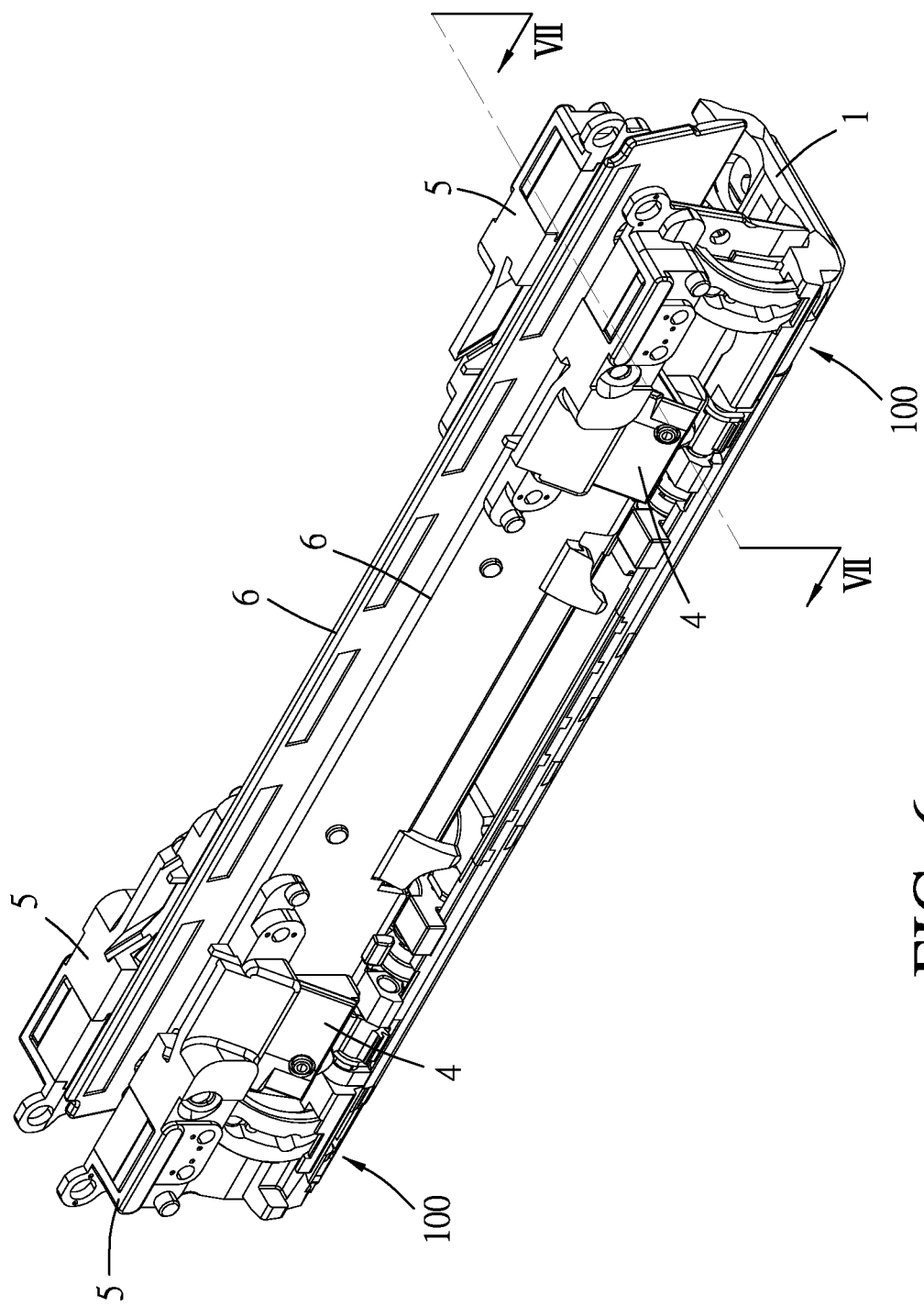
FIG. 6 is a perspective view of the embodiment, illustrating the two rotating units in a closed state.

The two rotating unit 2 are connected to the stationary seat 1 and configured to move between an opened state (as shown in FIG. 1) and a closed state (as shown in FIG. 6). Each rotating unit 2 includes a linkage module 3, a rotating bracket module 4, a sliding module 5, and a supporting board module 6. The linkage module 3 has a main body 31 and an extension body 32. The main body 31 has a first arcuate slide rail 311 that is slidably mounted in a respective one of the first curved grooves 11, and a carrying surface 312. The carrying surface 312 is connected to and supporting the supporting board module 6. The extension body 32 is connected to the main body 31, extends from the stationary seat 1, and has a second arcuate slide rail 321. The second arcuate slide rail 321 has an inner curved surface 322, an outer curved surface 323 that is opposite to the inner curved surface 322, and a limiting groove 324 that is formed in the outer curved surface 323. The limiting groove 324 has a closed end 324a, and an open end 324b that is opposite to the closed end 324a. The open end 324b of the limiting groove 324 is closer to the main body 31 compared to the closed end 324a.

Referring to FIGS. 3, 4, 8, and 9, the rotating bracket module 4 is rotatable relative to the stationary seat 1 and has an axle rod 41, a bracket body 42 connected to the axle rod 41, and a fixing pin 43 disposed on the bracket body 42. The axle rod 41 is connected rotatably to the stationary seat 1. The bracket body 42 rotates with the axle rod 41 acting as an axis of rotation, and has a main portion 421, an inclined guiding portion 422 that is connected to the main portion 421, that extends straightly from the main portion 421, and that is inclined relative to the carrying surface 312, and a relief groove 423 formed in the main portion 421. The fixing pin 43 is disposed on the main portion 421 of the bracket body 42 and passes through the relief groove 423.

Referring to FIGS. 3, 4, 5 and 7, the sliding module 5 includes a connecting frame 51 that is adapted for connecting with a respective one of the shell bodies 200, a positioning pin 52 that is disposed on the connecting frame 51, and a linkage member 53. The connecting frame 51 includes a base seat 511 and an assembling block 512. The base seat 511 and the assembling block 512 cooperate with each other to define a second curved groove 513 that has a matching curvature with the second arcuate slide rail 321. The second curved groove 513 is engaged with the second arcuate slide rail 321 such that movement of the rotating units 2 between the opened state and the closed state results in relative movement between the second arcuate slide rail 321 and the second curved groove 513. The inner curved surface 322 of the second arcuate slide rail 321 is adjacent to the base seat 511, and the outer curved surface 323 of the second arcuate slide rail 321 is adjacent to the assembling block 512. The assembling block 512 has a sliding surface 512a that is slidable relative to the outer curved surface 323, and a limiting protrusion 512b that protrudes from the sliding surface 512a and that engages with the limiting groove 324 to limit sliding action between the sliding surface 512a and the outer curved surface 323.

Figure 7:
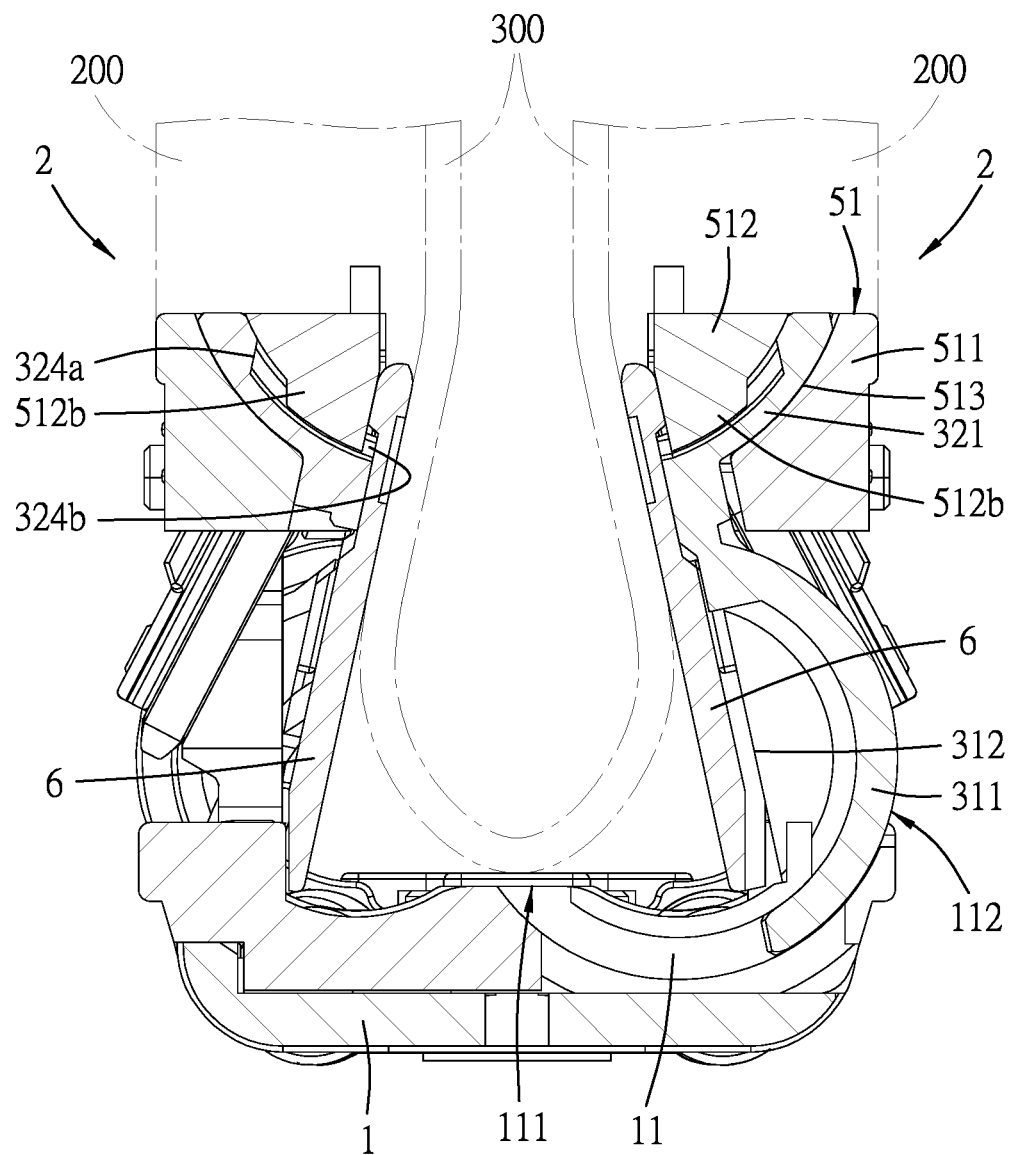
FIG. 7 is a cross-sectional view taken along line VII-VII in FIG. 6.

When the rotating units 2 are moved from the opened state (as shown in FIG. 5) toward the closed state (as shown in FIG. 7), for each of the rotating units 2, the slide rail 311 of the linkage module 3 slides with an arched trajectory along the respective first curved groove 11 in a direction from the inner end 111 toward the outer end 112 of the first curved groove 11 which causes the carrying surface 312, the supporting board module 6, the extension body 32, and the connecting frame 51 to move toward the other one of the rotating units 2. At the same time, this will result in relative movement between the second arcuate slide rail 321 and the second curved groove 513. Therefore, by virtue of the arched trajectory of the slide rail 311 and the relative movement between the second arcuate slide rail 321 and the second curved groove 513, when the rotating units 2 are in the closed state, the supporting board modules 6 converge towards each other corresponding to distance away from the stationary seat 1. This configuration creates space to accommodate the flexible display 300 between the supporting board modules 6. When the rotating units 2 are in the opened state, for each of the rotating units 2, the limiting protrusion 512b of the assembling block 512 abuts against the closed end 324a of the limiting groove 324. When the rotating units 2 are in the closed state, for each of the rotating units 2, the limiting protrusion 512b is adjacent to the open end 324b of the limiting groove 324.

The base seat 511 is formed with an accommodating groove 514 that receives said bracket body 42, and an inclined sliding portion 515 that is engaged with the inclined guiding portion 422, such that the movement of the rotating units 2 between the opened state and the closed state results in relative movement between the inclined guiding portion 422 and the inclined sliding portion 515. The positioning pin 52 is disposed on the base seat 511 of the connecting frame 51 between the second curved groove 513 and the accommodating groove 514.

Figure 8:
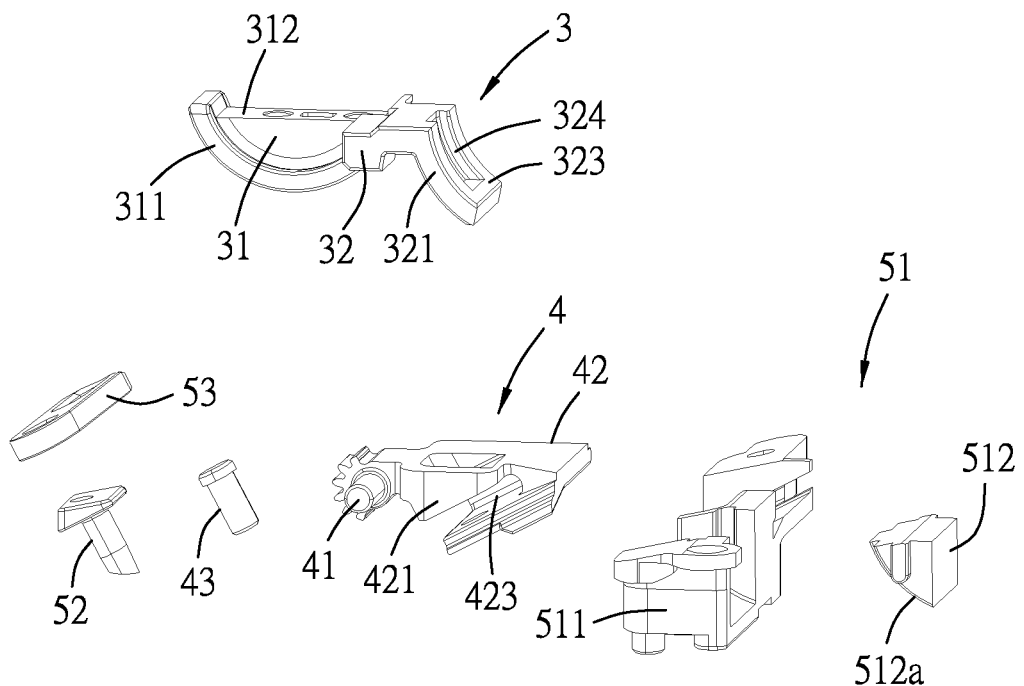
FIG. 8 is a fragmentary exploded perspective view of the embodiment, illustrating select components of the hinge.
Figure 9:
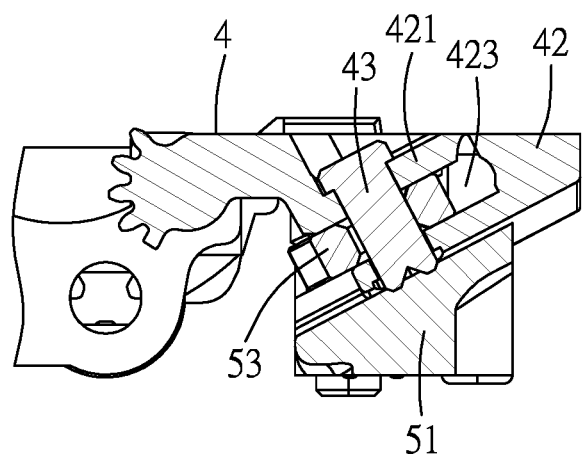
FIG. 9 is a fragmentary cross-sectional view of the embodiment, showing select components of the hinge.
Figure 10:
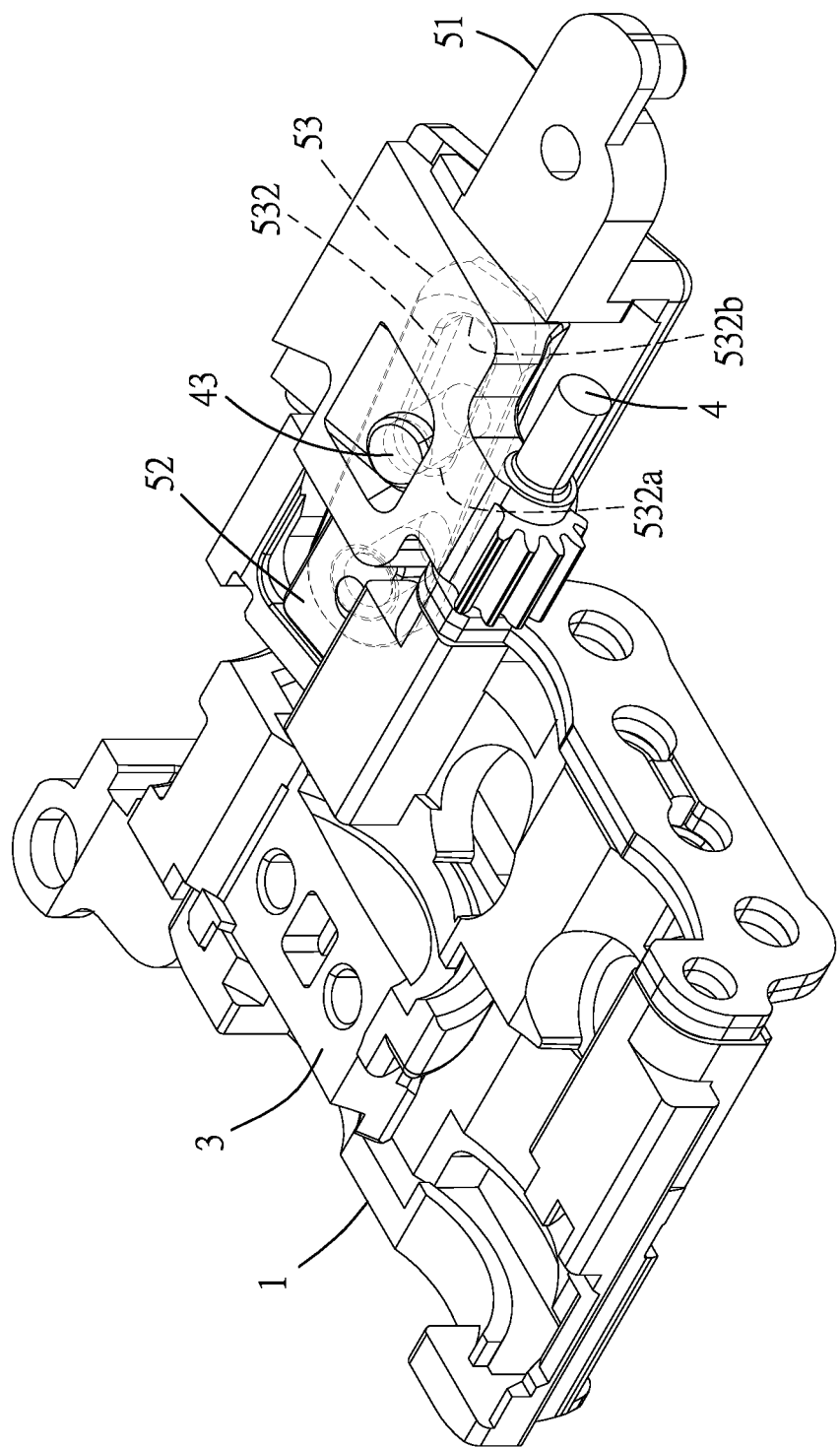
FIGS. 10, 12, 14, 16 respectively illustrate snapshots of the hinge when the rotating units are moved from the opened state to the closed state.

Referring to FIGS. 4, 8 and 10, the linkage member 53 has a through hole 531, and an elongated slot 532 that has opposite first and second ends 532a, 532b being respectively proximate to and distal from the through hole 531. The positioning pin 52 passes through the through hole 531. The fixing pin 43 passes through the elongated slot 532 to connect with the bracket body 42 such that the movement of the rotating units 2 between the opened state and the closed state results in relative movement between the fixing pin 43 and the elongated slot 532. The linkage member 53 engages the relief groove 423, with the part which is formed with the elongated slot 532 being movable in the relief groove 423.

Figure 11:
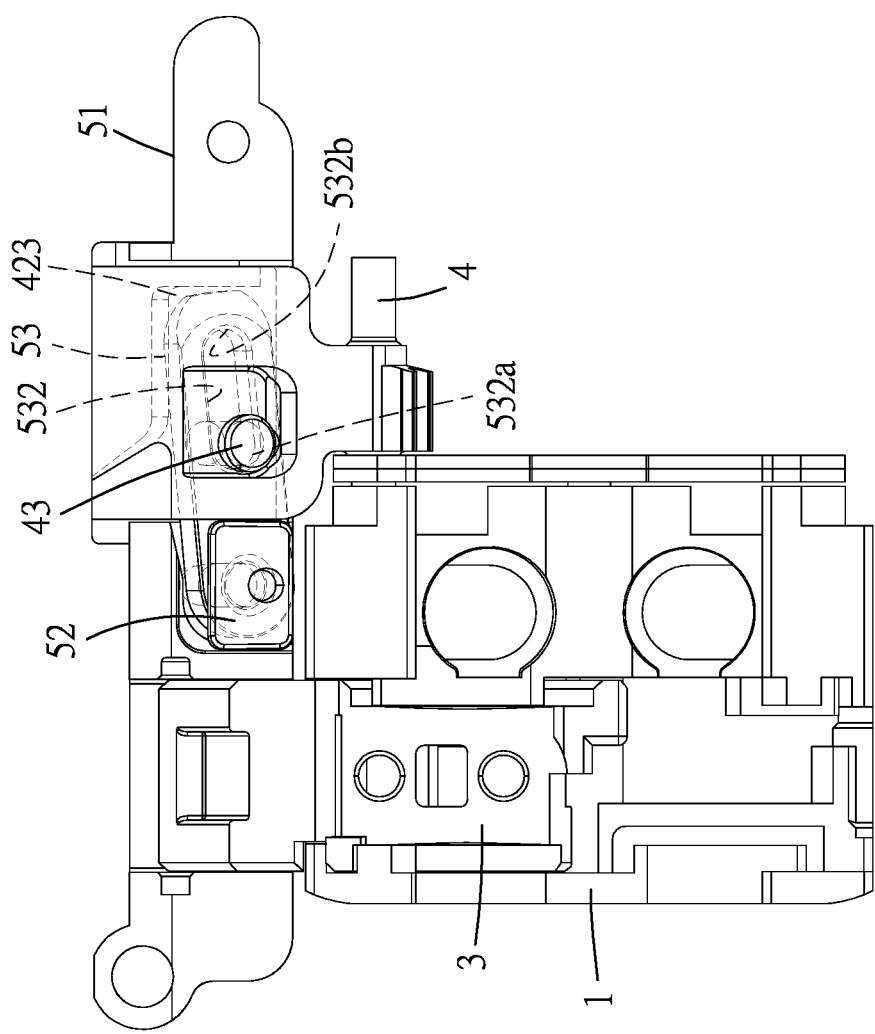
FIGS. 11, 13, 15, 17 respectively illustrate frontal views of the FIGS. 10, 12, 14, 16.
Figure 12:
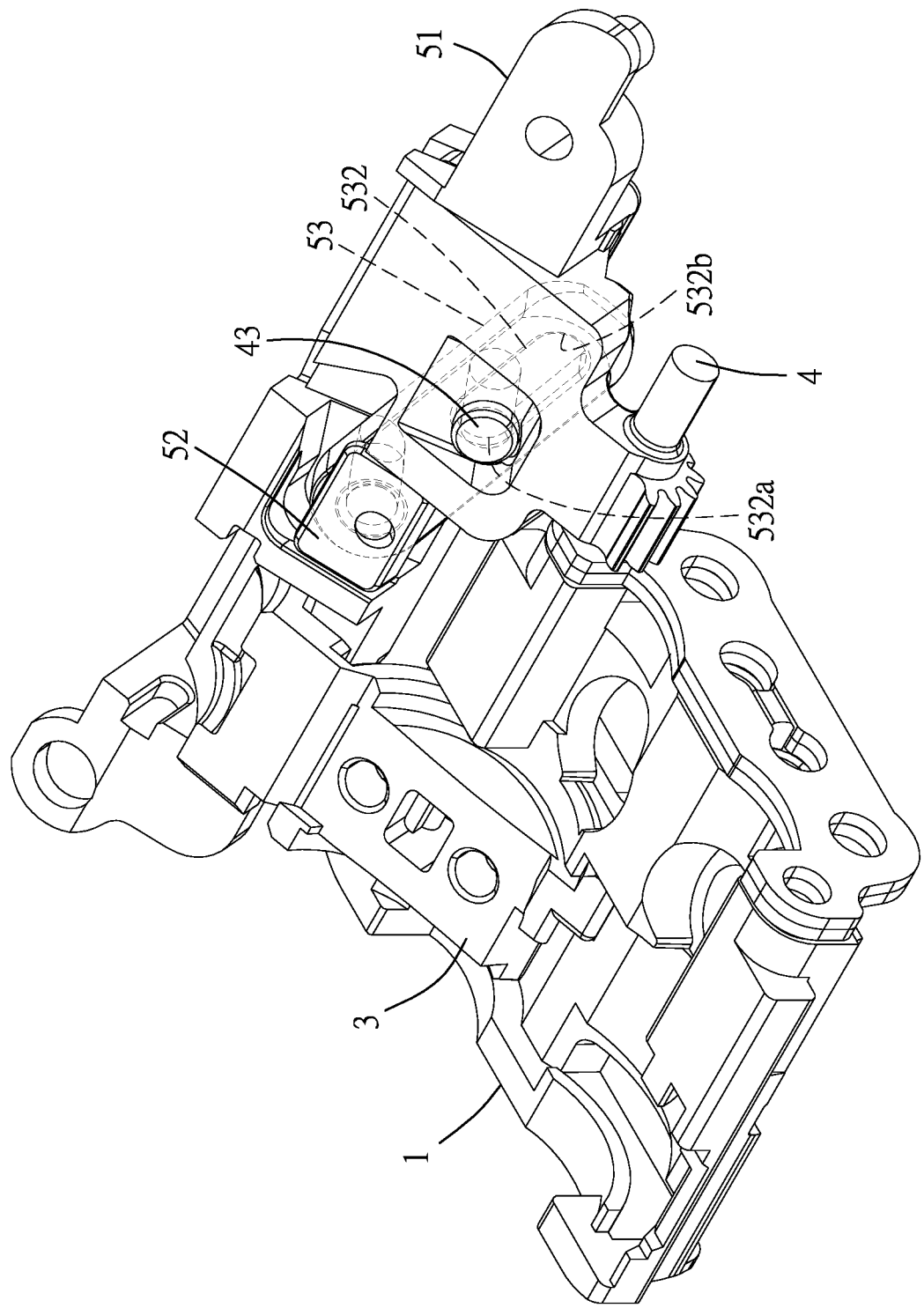
Figure 13:
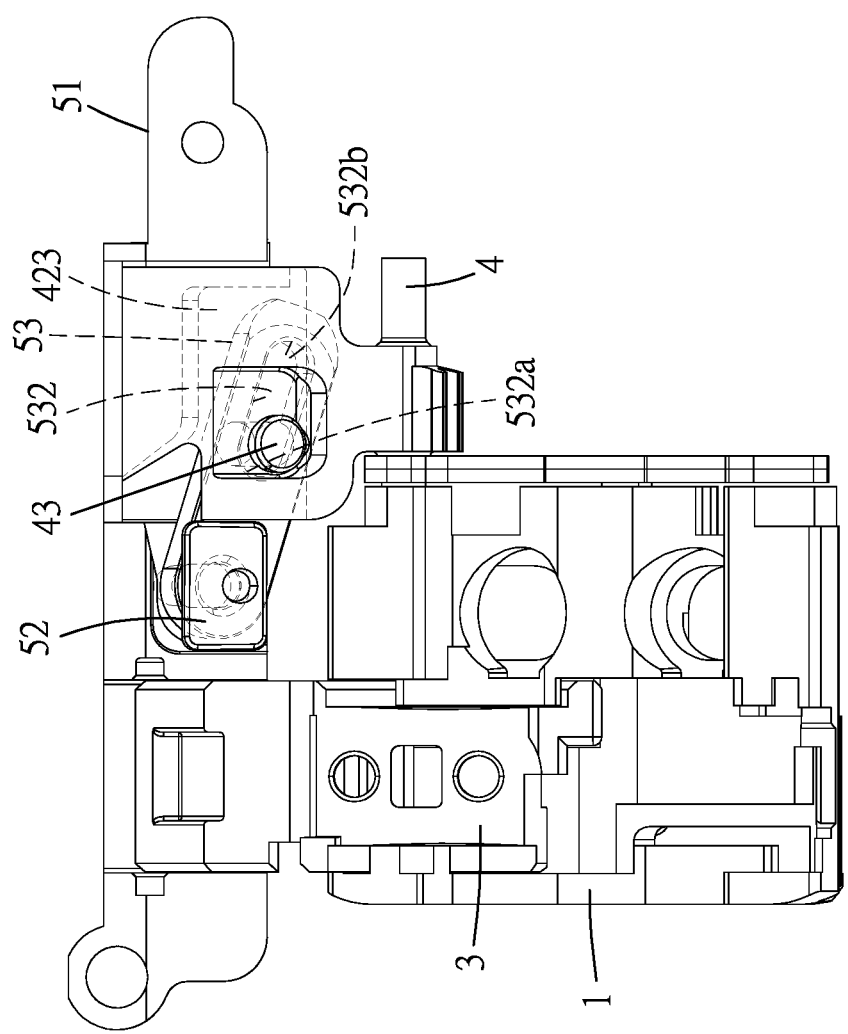
Figure 14:
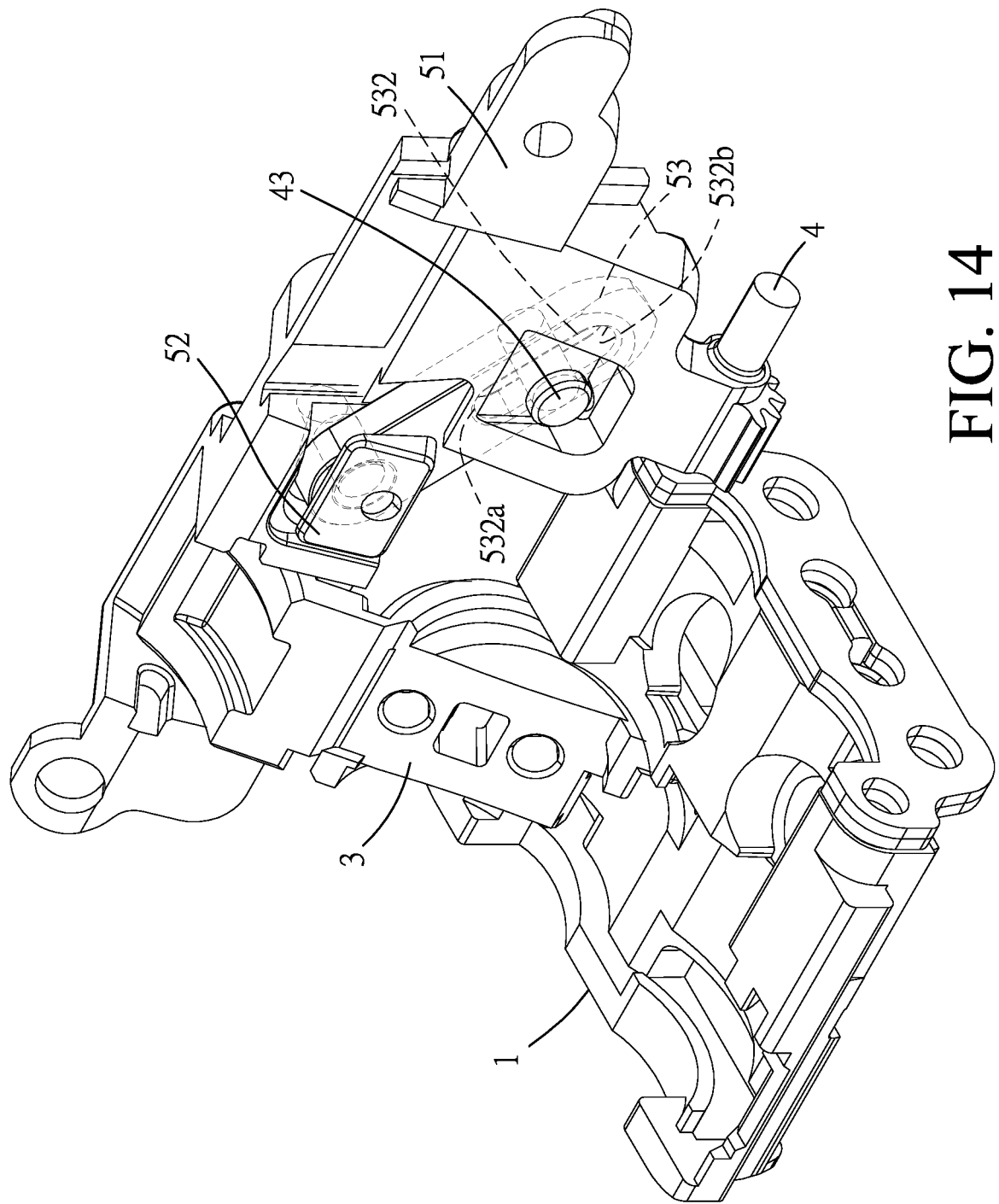
Figure 15:
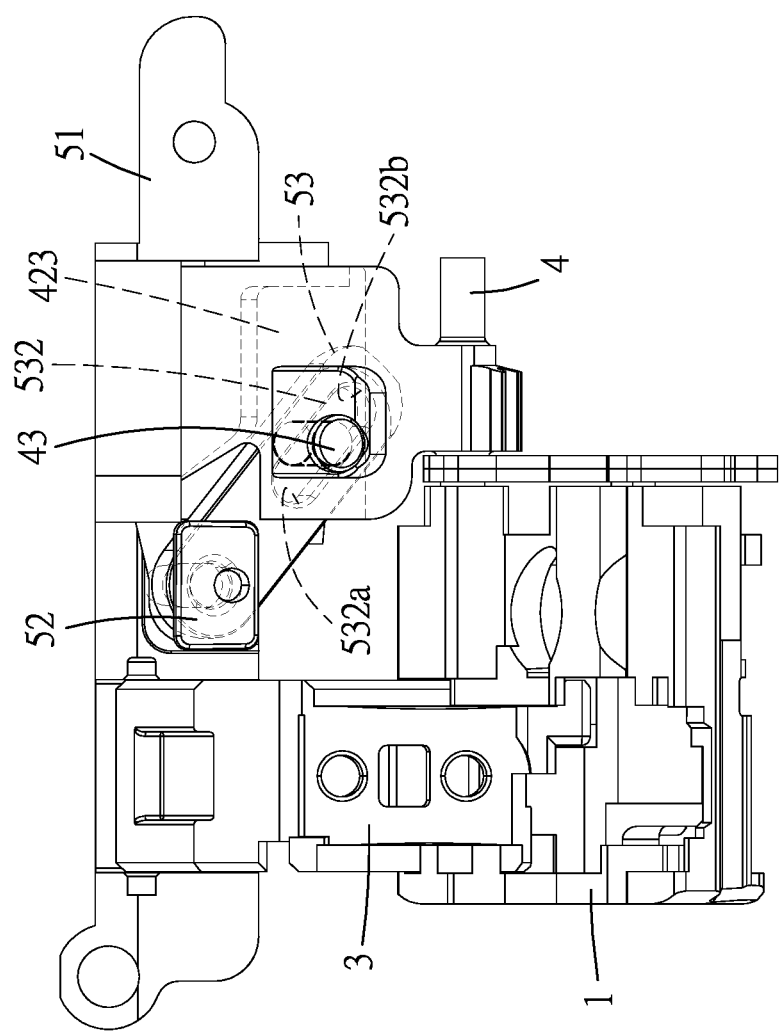
Figure 16:
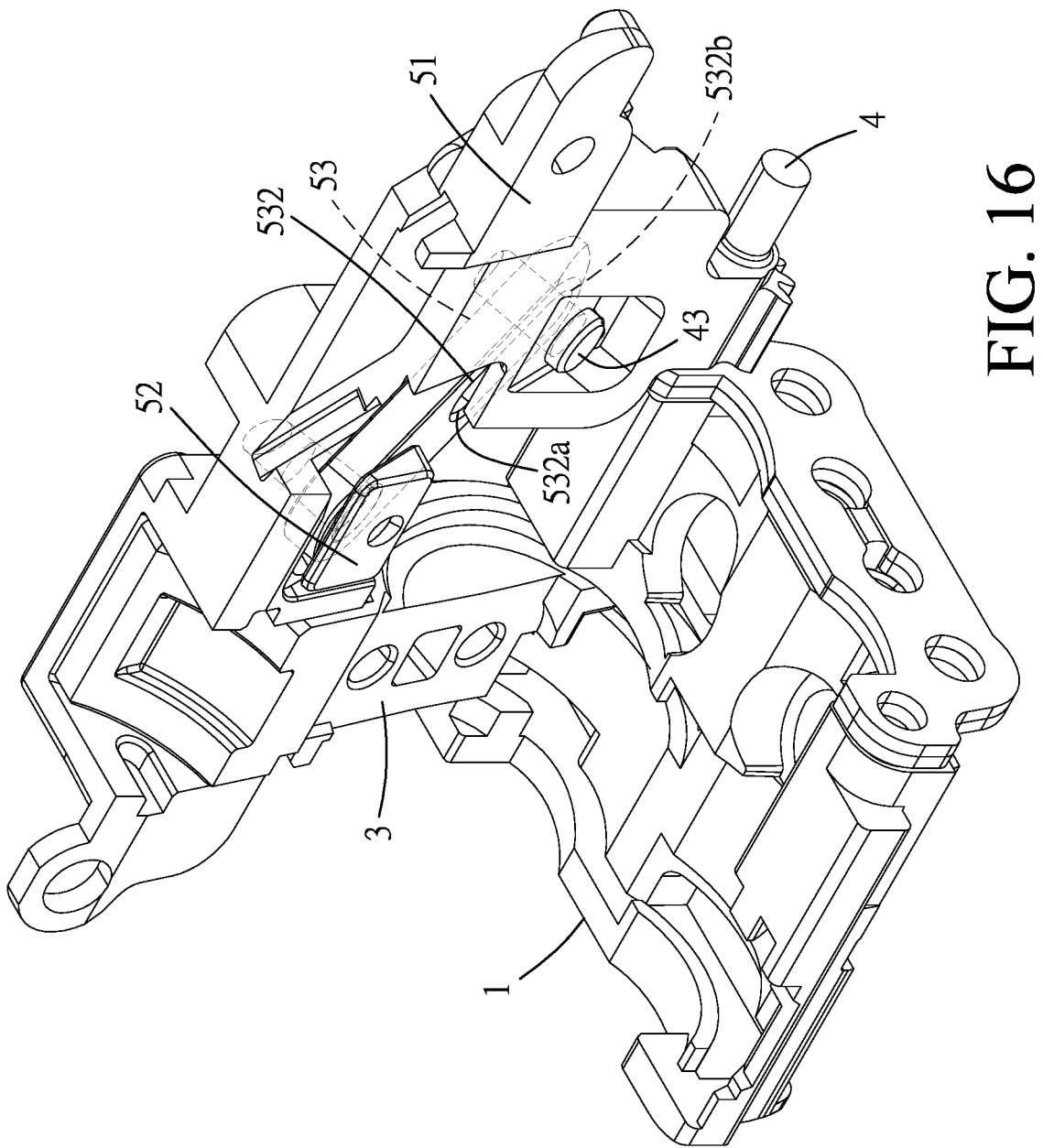
Figure 17:
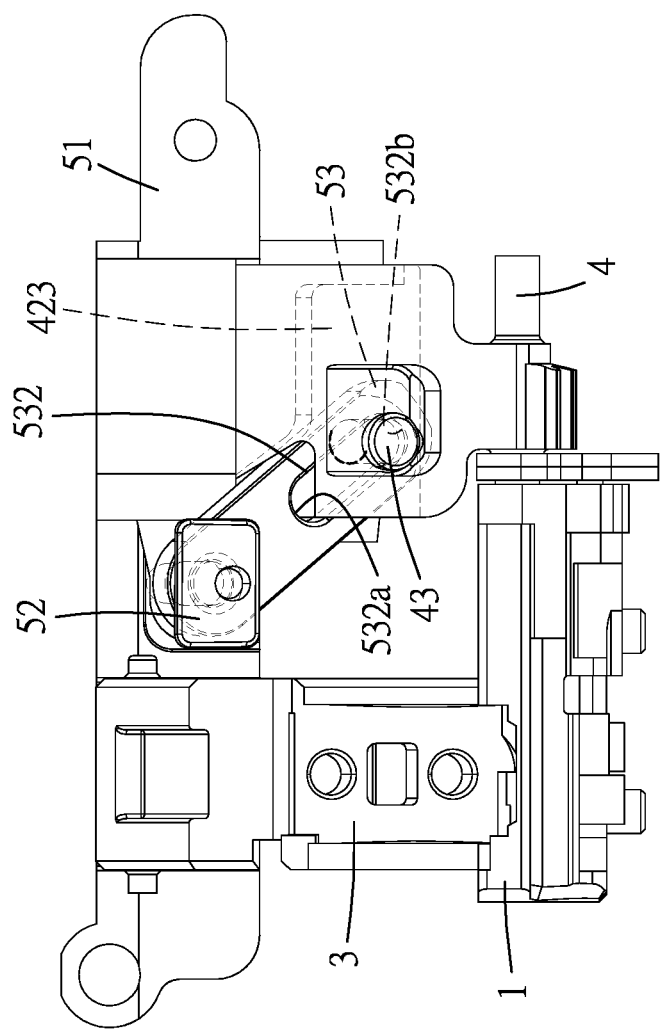

Referring to FIGS. 10 to 17, where FIGS. 10 and 11 show the rotating units 2 (only one is shown in the Figures) in the opened state, FIGS. 12 and 13 show the rotating bracket module 4 rotated 30° from the opened state, FIGS. 14, and 15 show the rotating bracket module 4 rotated 60° from the opened state, and FIGS. 16 and 17 show the rotating bracket module 4 rotated 90° and the rotating units 2 are in the closed state. When the rotating units 2 are moved from the opened state to the closed state, for each of the rotating units 2, the connecting frame 51 slides relative to the second curved slide rail 321 and the bracket body 42. The movement of the connecting frame 51 has a linear component (via the movement between the second arcuate slide rail 321 and the second curved groove 513) as well as a curved component (via the movement between the inclined guiding portion 422 of the bracket body 42 and the inclined sliding portion 515 of the base seat 511), so that, when in the closed state, the connecting frames 51 of each rotating unit 2 may be raised away from the stationary seat 1 and become closer to each other. The linkage member 53 is rotated about the positioning pin 52 and is rotated and linearly moved relative to the fixing pin 43, so that the elongated slot 532 of the linkage member 53 is moved relative to the fixing pin 43, from the first end portion 532a of the elongated slot 532 being proximate to the fixing pin 43 to the second end portion 532b of the elongated slot 532 being proximate to the fixing pin 43. Additionally, during the movement of the rotating units 2 from the opened state towards the closed state, the positioning pin 52 acts as an axle for the linkage member 53 to rotate. During the rotation of the linkage member 53, the elongated slot 532 of the linkage member 53 slides and rotates relative to the fixing pin 43. More specifically, the elongated slot 532 is moved in a motion starting with the first end 532a of the elongated slot 532 being proximate to the fixing pin 43 and then moved so that the second end 532b of the elongated slot 532 is proximate to the fixing pin 43; at the same time, the elongated slot 532 that is extended into the relief groove 423 is partially withdrawn from the relief groove 423. In other words, when the rotating units 2 are in the opened state the linkage member 53 is sheathed in the connecting frame 51 and the relief groove 423; however, when the rotating units 2 are in the closed state the linkage member 53 is extended out of the connecting frame 51.

By virtue of the linkage member 53 cooperating with the positioning pin 52 and the fixing pin 43 to perform a sliding movement and thereby act as a mechanical linkage to guide upwards movement of the connecting frame 51 and the rotating bracket module 4 when the rotating units 2 are moved towards the closed state, the hinge 100 according to the present disclosure can be made compact and space efficient while providing swift and smooth movement. In particular, the linkage member 53 is sheathed in the connecting frame 51 and the relief groove 423, and only when the rotating units 2 are in the closed state, will the linkage member 53 be extended out of the connecting frame 51, thereby increasing space efficiency and compactness of the hinge 100. Additionally, the linkage member 53, the positioning pin 52 and the fixing pin 43 cooperatively provide mechanical support for the respective rotating unit 2 during movement of the rotating units 2 between the opened state and the closed state, thereby allowing wider engineering tolerances for components of the hinge 100.

As shown in FIG. 2, the torque synchronizer 7 is connected to the rotating bracket module 4 to synchronize the rotational movement of the rotating units 2.

In summary of the above, by virtue of the linkage member 53 cooperating with the positioning pin 52, space efficiency and compactness of the hinge 100 may be optimized, and engineering tolerances of the components of the hinge 100 may be more relaxed.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A hinge adapted for connecting to two shell bodies such that the two shell bodies are openable and closable relative to each other, said hinge comprising:
   a stationary seat having two first curved grooves; and
   two rotating units connected to said stationary seat, and being configured to move between an opened state and a closed state, each rotating unit including
      a linkage module that has
         a main body having a first arcuate slide rail that is slidably mounted in a respective one of said first curved grooves, and a carrying surface, and
         an extension body extending from said stationary seat, and having a second arcuate slide rail,
      a rotating bracket module that is rotatable relative to said stationary seat and that has an axle rod connected rotatably to said stationary seat, a bracket body connected to said axle rod, and a fixing pin disposed on said bracket body, said bracket body having an inclined guiding portion that extends straightly and that is inclined relative to said carrying surface, and
      a sliding module that includes a connecting frame adapted for connecting with a respective one of the shell bodies, a positioning pin disposed on said connecting frame, and a linkage member having a through hole, said connecting frame having a second curved groove that is engaged with said second arcuate slide rail such that movement of said rotating units between the opened state and the closed state results in relative movement between said second arcuate slide rail and said second curved groove, an accommodating groove that receives said bracket body, and an inclined sliding portion that is engaged with said inclined guiding portion such that the movement of said rotating units between the opened state and the closed state results in relative movement between said inclined guiding portion and said inclined sliding portion, said positioning pin being located between said second curved groove and the accommodating groove, and passing through said through hole of said linkage member, said linkage member further having an elongated slot that has opposite first and second ends being respectively proximate to and distal from said through hole, said fixing pin passing through said elongated slot to connect with said bracket body such that the movement of said rotating units between the opened state and the closed state results in relative movement between said fixing pin and said elongated slot;

wherein, when said rotating units are moved from the opened state to the closed state, for each of said rotating units, said connecting frame slides relative to the second curved slide rail and said bracket body, and said linkage member is rotated about said positioning pin and is rotated and linearly moved relative to said fixing pin, so that said elongated slot of said linkage member is moved relative to said fixing pin, from said first end portion of said elongated slot being proximate to said fixing pin to said second end portion of said elongated slot being proximate to said fixing pin.

2. The hinge as claimed in claim 1, wherein said bracket body further has a relief groove, said fixing pin further passing through said relief groove, said linkage member movably engaging said relief groove.

3. The hinge as claimed in claim 1, wherein said connecting frame includes a base seat and an assembling block, said base seat and said assembling block cooperating with other each to define said second curved groove, said base seat being formed with said accommodating groove and said inclined sliding portion.

4. The hinge as claimed in claim 3, wherein:
said second arcuate slide rai has an inner curved surface that is adjacent to said base seat, an outer curved surface that is adjacent to said assembling block, and a limiting groove that is formed in said outer curved surface; and
said assembling block has a sliding surface that is slidable relative to said outer curved surface, and a limiting protrusion that protrudes from said sliding surface and that engages with said limiting groove.

5. The hinge as claimed in claim 1, wherein said first curved grooves are arranged along a centerline, each of said first curved grooves having an inner end that intersects the centerline and an outer end that is opposite to said inner end, said outer ends of said first curved grooves being located respectively on two opposite sides of the centerline.

\* \* \* \* \*